Oct. 20, 1959  J. A. W. MADSEN  2,909,249
SPINDLE LOCK
Filed May 16, 1957  2 Sheets-Sheet 1
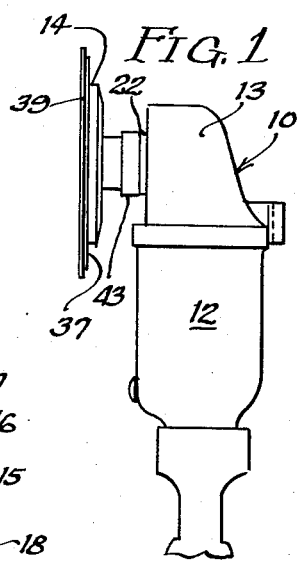
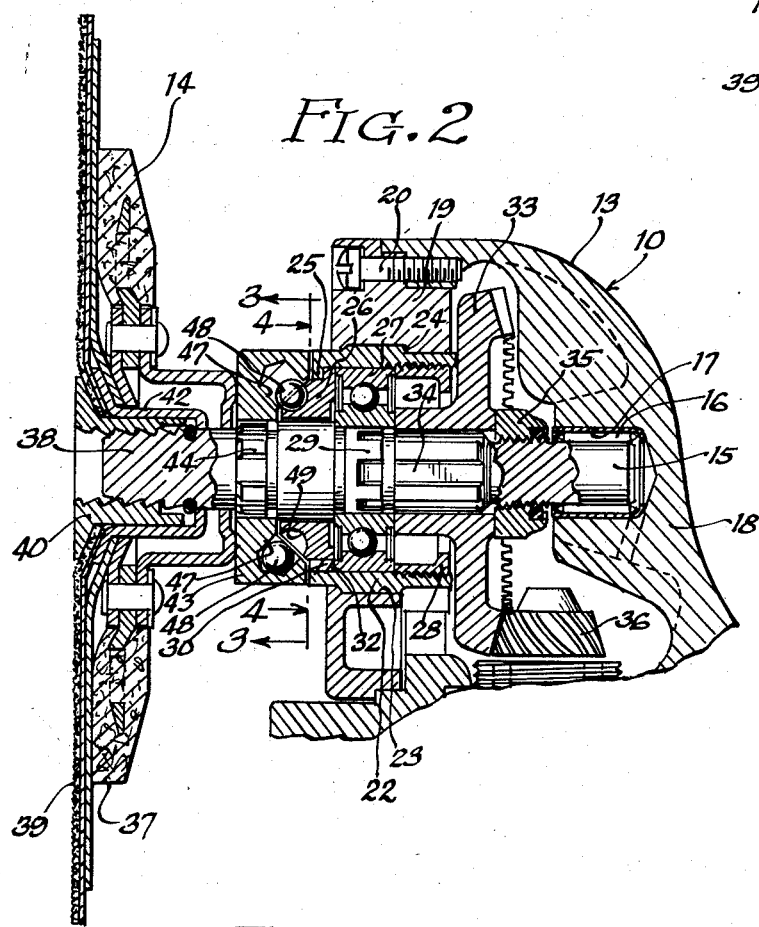
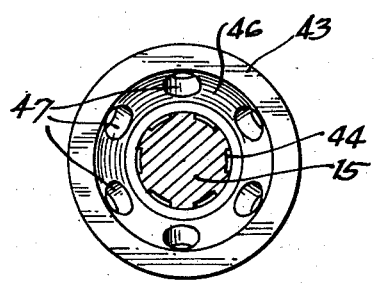
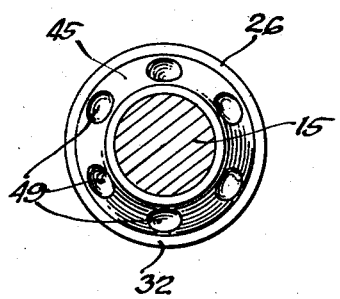
INVENTOR.
Jens Axel W. Madsen
BY
Horton, Davis, Brewer & Brugman
Attorneys

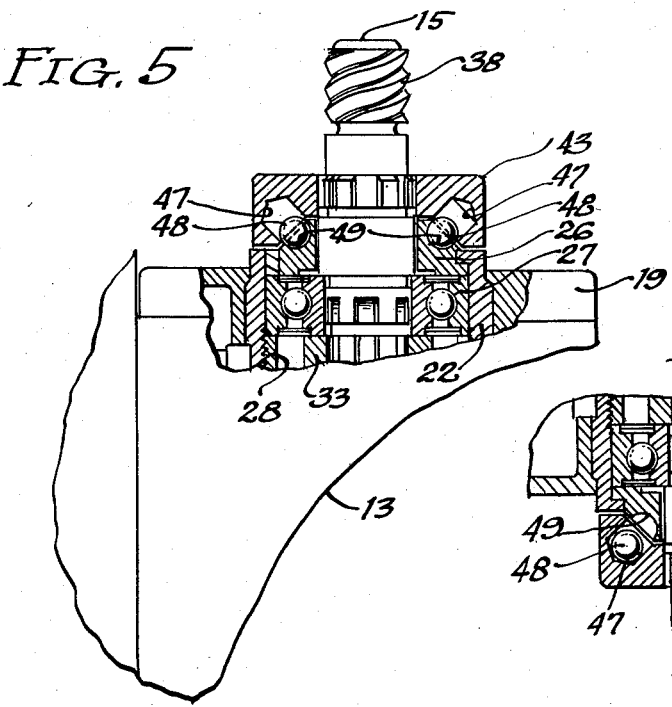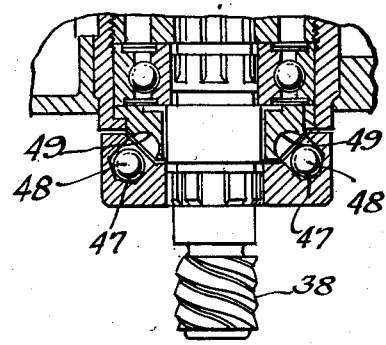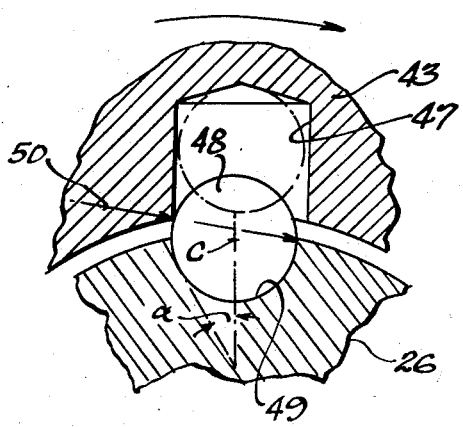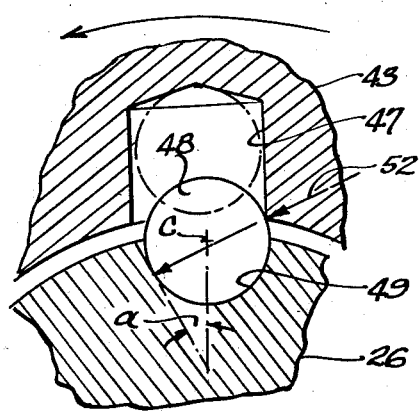

United States Patent Office 2,909,249
Patented Oct. 20, 1959

2,909,249

SPINDLE LOCK

Jens Axel W. Madsen, Sioux City, Iowa, assignor to Albertson & Company, Inc., Sioux City, Iowa, a corporation of Iowa Application May 16, 1957, Serial No. 659,692

5 Claims. (Cl. 188—174)

This application relates to spindle locks, and more particularly to such locks which are automatically rendered effective by the occurrence of predetermined controllable conditions to prevent rotation of a normally rotatable part in one direction with reference to another part of a mechanism and to effect release of the normally rotatable part upon alteration of the conditions.

One of the objects of this invention is to provide a spindle lock adaptable to use on tools or mechanisms having driven spindles and the use of which tools makes desirable at times the temporary prevention of rotation of the driven spindle without requiring the user to perform some continuing manual operation for holding the spindle against rotation.

Another object of my invention is to provide a spindle lock adapted to use for effecting temporary retention of a power driven spindle and which, upon the application of power to the spindle, will release the spindle for rotation without damage to the lock or other mechanism.

As another object, the invention has within its purview the provision of a releasable lock for holding a normally rotatable spindle, and in which lock, one or more parts move by gravitational force when the spindle is pointed in a predetermined direction, thereby effectively to engage and hold the spindle against rotation.

This invention further comprehends the provision of a spindle lock having parts constructed and arranged to provide more effective retention of the spindle against rotation in one direction than in the other.

My invention has for another object the provision of a spindle locking mechanism in which the action of centrifugal force upon the locking parts prevents those parts from becoming engaged to lock the spindle while it is being driven.

Other objects and advantages of the invention will be apparent from the following description and the accompanying drawings in which similar characters of reference indicate similar parts throughout the several views.

Referring to the drawings of which there are two sheets:

Fig. 1 is a side elevational view of one type of tool in which the spindle lock of this invention is adapted to use, and in connection with which the disclosed embodiment is illustrated;

Fig. 2 is a fragmentary side sectional view of a portion of the tool shown in Fig. 1, and is drawn to a larger scale than Fig. 1;

Figs. 3 and 4 are respectively end sectional views taken substantially as indicated by lines 3—3 and 4—4 and accompanying arrows in Fig. 2;

Figs. 5 and 6 are fragmentary side views of the tool shown in Fig. 2, wherein the parts are shown in inverted views with respect to one another, thereby to illustrate differences in the operating positions of parts which are affected by the inversion; and Figs. 7 and 8 are fragmentary diagrammatic views of a portion of the structure illustrated, and which depict different operating conditions of the illustrated spindle lock.

In the exemplary embodiment of the invention which is depicted herein for illustrative purposes, I have shown the adaptation of my invention to a portable sander 10 which includes a prime mover, such as a motor 12, a gear housing 13 and a disc sander 14. It may be readily understood that the spindle lock of this invention is not at all limited to use on portable sanders, but is well suited to uses on tools having various positions of operation, such as portable tools, and particularly to tools requiring the change of parts that are secured to and normally driven by a rotating spindle.

In the disclosed structure, one end of a spindle 15 is supported for rotation by a needle bearing 16 mounted in a bearing bore 17 in the mid-portion of a wall 18 of the gear housing 13. The spindle 15 projects from the gear housing 13 through an end cap 19 secured to the front portion of the housing by fastening means such as screws 20. A sleeve 22 is cast into an opening 23 in the mid-portion of the end cap 19 and has an inner surface in concentric relationship to the bearing 16 and spindle 15, as well as a shoulder 24 on the outer surface thereof.

An inwardly projecting flange 25 on the outer end of the sleeve 22 provides an abutment for axially locating a collar 26 within the sleeve. A bearing 27 which, in the present instance, is of the anti-friction type, abuts the collar 26 and is secured in place against that collar by a ring 28 which is threaded into the sleeve 22 at the end thereof opposite the flange 25. This secures the bearing 27 in place within the gear housing and the bearing is fitted onto a portion 29 of the spindle 15 in spaced relationship to the bearing 16, thereby to afford a rotatable support for the spindle 15 with respect to the gear housing 13. Rotation of the collar 26 relative to the gear housing is prevented by a locking tongue 30 on the sleeve 22, which locking tongue extends into a radial slot 32 in a peripheral portion of the collar.

For driving the spindle in the disclosed tool, a beveled gear 33 is mounted on a splined portion 34 of the spindle 15 with one end abutting the bearing 27 and with a self-locking nut 35 threaded onto the spindle and abutting the gear at the end opposite the bearing 27. A beveled driving gear 36 which is mounted on the shaft of the motor 12 meshes with the beveled gear 33, thereby to drive the spindle 15 from the motor.

In the structure disclosed, the disc sander 14 includes a backing disc structure 37 which is mounted upon and driven from a projecting end portion 38 of the spindle 15. The backing disc structure carries and provides support for replaceable sanding discs 39 which, in use, are removably held in place against the backing disc structure by a nut 40 threaded onto the projecting end portion 38 of the spindle. In the disclosed structure, the nut 40 is non-rotatably mounted within a driving collar 42 which comprises a part of the backing disc structure, and whereby the nut 40 may be loosened or tightened on the end portion of the spindle 15 by rotating the entire disc sander while the spindle is held stationary.

For effecting the loosening and tightening of the nut 40 which accompanies the change of sanding discs, it may be readily understood that it is desirable to have a lock for preventing rotation of the spindle 15 relative to the gear housing 13, and which lock leaves one of the user's hands free to turn the disc sander, while the other is utilized to support the entire tool. For accomplishing such spindle locking operation, I have provided a structure embodying a ring 43 which is non-rotatably secured to a splined portion 44 of the spindle 15 adjacent the collar 26 on the spindle and exterior to the housing 13.

The collar 26 and the ring 43 have opposed and concentric beveled surfaces 45 and 46 respectively thereon, which surfaces, as will be more fully explained, are spaced apart somewhat.

Extending into the ring 43 through the beveled surface 46 thereof are a plurality of similar recesses or pockets 47 which are equally spaced circumferentially of the surface 46 and which are each circular in cross section. The axes of the recesses or pockets 47 lie in radial planes and are substantially perpendicular to the surface 46, so that those axes each have components which extend axially and radially with respect to the axis of rotation of the spindle. Freely movable within each of the recesses or pockets 47 is a locking element in the form of a metal ball 48. The diameter of each ball is slightly less than that of the recess or pocket 47, and each such recess or pocket has a depth such that the ball, when retracted into the recess or pocket, does not project from the ring so as to contact any part of the collar 26.

Recesses 49 extend into the collar 26 through the surface 45 thereof. These recesses 49 are similar to one another and generally somewhat hemispherical in shape, and are equally spaced circumferentially of the surface 45 of the collar, so that in a plurality of positions of rotation of the spindle 15 and the ring 43 relative to the collar 26, the recesses 49 are aligned with the recesses or pockets 47. The recesses 49 are of a size such that the ball-type locking elements 48 fit therein, and the depth of the recesses 49 is such that when the ball-type locking elements are engaged or seated in those recesses, a portion of each ball projects into one of the recesses 47 for engagement with the ring, thereby to hold the ring against rotation relative to the collar 26 and to lock the spindle against rotation.

Since the axes of the pockets or recesses 47 have acute angular relationship to the axis or rotation of the spindle and since the ball-type locking elements are freely movable within the recesses 47, it may be readily understood that when the projecting end of the spindle 15 extends upwardly, as shown in Fig. 5, the locking elements are normally moved by gravity into a position for engagement in the recesses 49 of the collar, when the spindle is turned to a position such that the recesses in the ring 43 and collar 26 are aligned. Conversely, when the projecting end of the spindle is pointed downwardly, as shown in Fig. 6, the locking elements are moved by gravity into the recesses or pockets 47 of the ring 43, and the spindle is free to rotate. A further reason for having the axes of the pockets or recesses 47 disposed in acute angular relationship to the axis of rotation of the spindle 15 is that during rotation of the spindle, and particularly while that spindle is being driven by the motor 12, centrifugal force holds the locking elements in their retracted positions within the recesses or pockets 47. Thus, the locking elements are rendered ineffective while the spindle is being driven.

In order to avoid damage to the mechanism of the tool or to the prime mover in the event that power should be applied to the motor 12 while the tool is in a position such that the locking elements are engaged in their spindle locking positions, a further refinement has been added to the structure, as depicted in Figs. 7 and 8, which provides for the disengagement of the ball-type locking elements from the recesses 49 of the collar 26 upon rotation of the spindle 15 in the direction in which it is driven by the motor 12. That is, the axes of the recesses 49 are angled circumferentially of the collar 26 in the direction of normal driven rotation of the spindle 15 and circumferentially of the collar 26 by an angle which, in Figs. 7 and 8, is designated as the angle $a$. As a result of this angulation of the axes of the recesses 49 circumferentially away from a radial plane in the normal direction of rotation of the spindle when driven by the motor 12, and by virtue of the depths of the recesses 49 and the spacing between the collar 26 and ring 43, the positions of the action lines of forces acting through the ball-type locking elements 48 and between the positions of contact of those ball-type locking elements with the ring 43 and collar 26, as indicated by arrows 50 and 52 in Figs. 7 and 8, are different for the two directions of relative rotation between the parts. As shown in Fig. 7, wherein the direction of rotation of the spindle and ring 43 is counter to that effected by operation of the motor, the action line of the force 50 through the locking element 48 is above the center $c$ of the locking element, so that it tends to hold the locking element firmly in the recess 49, thereby to provide a positive and definite locking action. As depicted in Fig. 8, the action line of the force 52 which acts through the locking element 48 in the normal direction of driven operation of the spindle is below the center $c$ of the locking element, so that it has a component tending to lift the locking element from the recess 49 in the collar 26, thereby to force the locking element into the pocket or recess 49 in the ring 43 and effect release of the locking action.

The angle $a$ is so related to the depth of the recess 49 in each instance and to the spacing between the collar 26 and ring 43 that the locking elements provide a positive spindle locking action for tightening of the nut 40 on the end of the spindle. In the reverse direction, the locking action is only semi-positive. That is, it affords sufficient resistance to spindle rotation for effecting the loosening of the nut 40 on the spindle, but is subject to release. As a safety feature, the application of power to the motor 12 will exert sufficient force to effect the removal of the locking elements from the recesses 49, whereupon centrifugal force will hold those locking elements in their retracted positions in the pockets or recesses 47 of the ring. Although not at all limited thereto for different requirements and in different sizes or types of machines, illustrative examples of the part dimensions are that with ball-type locking elements of approximately one-quarter inch diameter and with a spacing of between .020 inch and .030 inch (which is approximately 8% to 12% of the ball diameter) between the ring and collar and with the depth of the recesses 49 slightly greater than the radii of the ball-type locking elements, a satisfactory angle of deviation of the axes of the recesses 49 from a radial position is an angle between 26° and 28°.

From the foregoing description, it may be readily understood that I have provided a spindle lock which does not require any continuing manual operation to effect the holding of a spindle against rotation, but which is practically automatic in its operation and controlled by the position in which the tool is held. During operation, it is ineffective in any position, because of the action of centrifugal force upon the locking elements. In the form disclosed, the effectiveness of the lock is different in the two directions of rotation of the spindle, and the possibility of damage to the mechanism or to the prime mover as a result of applying power to the motor while the spindle is locked is minimized.

It is understood that the foregoing description is merely illustrative of a preferred embodiment of the invention and that the scope of the invention is not to be limited thereto but is to be determined by the appended claims.

I claim:

1. A mechanism for power-releasably locking a power-operated spindle against hand turning in either direction which comprises, in combination, a spindle support, a spindle journalled for rotation in said support, power-operated means for driving the spindle, a collar encompassing the spindle and non-rotatably secured to the support, a ring secured to the spindle adjacent the collar, said ring and collar having concentric circular surfaces thereon in opposed and spaced relationship to one another, said surfaces extending in acute angular and concentric relationship to the axis of rotation of the spindle, said ring and said collar respectively having recesses of different depths therein which open through said surfaces at positions to become aligned in opposed relationship during relative rotation of the ring and collar and with the deeper recesses in the part farthest from said spindle, the shallower of said recesses being drilled at an angle of from about 26° to about 28° from radial and tilted to open in the direction of power-driven rotation, locking means movably disposed in the deeper of said recesses and retractable therein to a position free of engagement with the part having the shallower recesses, said locking means having an extended position in which it is engaged in aligned recesses to prevent rotation of said part, the distance between said collar and said ring being from about 0.08 to about 0.12 of the diameter of said locking element.

2. A spindle locking mechanism as defined in claim 1 and wherein said locking means comprises a ball movable into the deeper recess by centrifugal force resulting from rotation of the spindle by the power operated means and movable by gravity to the extended position when the spindle is stationary.

3. A spindle locking mechanism as defined in claim 1, and wherein said locking means comprises a ball, the depth of the deeper recess is approximately equal to the diameter of the ball, and the depth of the shallower recess is sufficiently less than the diameter of the ball that when the ball is seated in the shallower recess it bridges the space between the ring and collar to prevent relative rotation therebetween while thus seated.

4. A spindle locking mechanism as defined in claim 1, and wherein the deeper recess is in the ring, and the shallower recess is in the collar.

5. A spindle locking mechanism as defined in claim 1, and wherein said locking means is a ball freely movable in the deeper recess and engageable to approximately half its diameter in the shallower recess when the recesses are aligned, the position of the ball depending upon gravitational force resulting from the position of said support.

References Cited in the file of this patent

UNITED STATES PATENTS

| | | |
|---|---|---|
| 1,499,923 | Hall | July 1, 1924 |
| 2,536,017 | Bamberger | Jan. 2, 1951 |
| 2,588,479 | Burchett et al. | Mar. 11, 1952 |